(12) United States Patent
McKinstrie et al.

(10) Patent No.: US 9,753,353 B2
(45) Date of Patent: *Sep. 5, 2017

(54) SYSTEM AND METHOD FOR OPTICAL SIGNAL QUADRATURE SEPARATION

(71) Applicant: Vencore Labs, Inc., Basking Ridge, NJ (US)

(72) Inventors: Colin McKinstrie, Basking Ridge, NJ (US); Anjali Agarwal, Basking Ridge, NJ (US)

(73) Assignee: Vencore Labs, Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/166,883

(22) Filed: May 27, 2016

(65) Prior Publication Data

US 2016/0357088 A1  Dec. 8, 2016

Related U.S. Application Data

(60) Provisional application No. 62/170,524, filed on Jun. 3, 2015.

(51) Int. Cl.
*G02F 1/39* (2006.01)
*G02F 1/35* (2006.01)
*H01S 3/00* (2006.01)

(52) U.S. Cl.
CPC .............. *G02F 1/39* (2013.01); *G02F 1/3532* (2013.01); *H01S 3/0078* (2013.01); *G02F 2001/392* (2013.01); *G02F 2203/13* (2013.01)

(58) Field of Classification Search
CPC ..... G02F 1/3532; G02F 1/39; G02F 2001/392; H01S 3/0078
See application file for complete search history.

(56) References Cited

U.S. PATENT DOCUMENTS 6,710,914 B2 * 3/2004 Arbore ................. G02F 1/39
359/330
8,040,929 B2 * 10/2011 Imeshev ............... G02F 1/3558
372/21
2016/0359569 A1 * 12/2016 Dailey .................. H04B 10/90

FOREIGN PATENT DOCUMENTS

JP   WO 2015133227 A1 * 9/2015 ........... H04B 10/299

OTHER PUBLICATIONS

S. Dhillon, et al, "Terahertz transfer onto a telecom optical carrier," Nature Photonics, vol. 1, p. 411 (2007).
(Continued)

*Primary Examiner* — Daniel Petkovsek
(74) *Attorney, Agent, or Firm* — Heslin Rothenberg Farley & Mesiti P.C.

(57) ABSTRACT

A system and method for separating signal quadratures includes obtaining, by a parametric amplifier, an input signal, amplifying, by the parametric amplifier, the input signal to create an amplified signal and generating an idler. The idler is a conjugate image of the input signal. The system and method also include obtaining, by a frequency converter, the amplified signal and the conjugate image and converting the amplified signal and the conjugate image into a first output and a second output, where the first output includes a first signal quadrature and the second output includes a second output quadrature.

18 Claims, 1 Drawing Sheet

(56) References Cited

OTHER PUBLICATIONS

D. M. Baney, et. al., "Coherent optical spectrum analyzer," IEEE PTL 14, (2002).
C. V. Bennett and B. H. Kolner, "Principles of parametric temporal imaging—Part I: System configurations," IEEE JQE 36, (2000).

\* cited by examiner

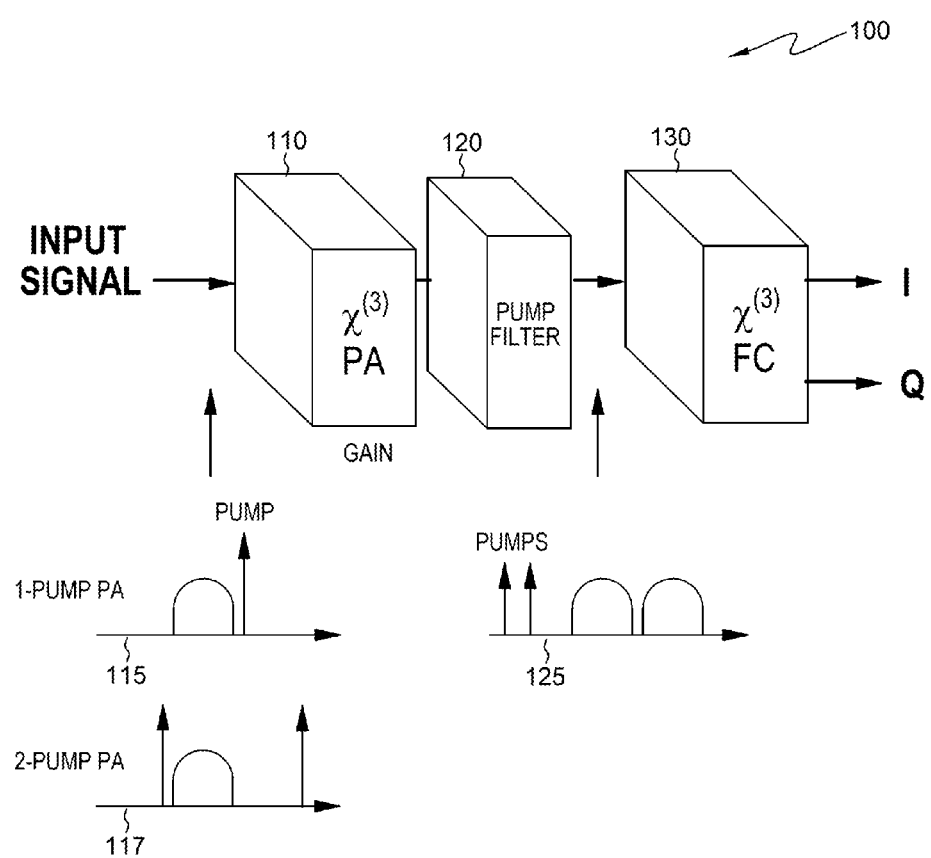

SYSTEM AND METHOD FOR OPTICAL SIGNAL QUADRATURE SEPARATION

CROSS-REFERENCE TO RELATED APPLICATIONS

This application claims priority to U.S. Provisional Application No. 62/170,524 filed Jun. 3, 2015, entitled, "SYSTEM AND METHOD FOR OPTICAL SIGNAL QUADRATURE SEPARATION" which is incorporated herein by reference in its entirety.

STATEMENT REGARDING FEDERALLY SPONSORED RESEARCH OR DEVELOPMENT

This invention was made with government support under contract number W31P4Q-13-C-0069 awarded by the U.S. Department of Defense, DARPA Quiness Program. The government has certain rights in the invention.

FIELD OF INVENTION

The Invention relates generally to a system and method that enables ultra-wideband separation of signal quadratures for in-phase (I)/quadrature-phase (Q) processing.

BACKGROUND OF INVENTION

Most current research is focused on looking at materials and techniques for the generation and detection of terahertz (THz) signals with little attention on higher level system aspects such as the amplification and spectral analysis of these signals. For example, conventional complex signal detection and analysis require coherent detection and down-conversion to intermediate frequencies (IF) or baseband. Research in nonlinear optical processing has utilized two techniques: optical parametric amplification and optical frequency conversion. Optical parametric amplification (PA) and optical frequency conversion (FC) are separate processes that can only be accomplished utilizing separate devices and have not been combined in any single system or method.

SUMMARY OF INVENTION

Shortcomings of the prior art are also overcome and additional advantages are provided through the provision of a method for separating signal quadratures of the optical signal, the method includes: obtaining, by a parametric amplifier, an input signal; amplifying, by the parametric amplifier, the input signal to create an amplified signal generating an idler comprising a conjugate image of the input signal; obtaining, by a frequency converter, the amplified signal and the conjugate image and converting the amplified signal and the conjugate image into a first output and a second output, wherein the first output comprises a first output signal quadrature and the second output comprises a second output signal quadrature.

A further embodiment of the present invention includes a system for separating signal quadratures that includes a parametric amplifier to obtain an input signal and to amplify the input signal to generate an amplified and an idler comprising a conjugate image of the input signal; a frequency converter, coupled to the parametric amplifier, to obtain the amplified signal and the conjugate image from the parametric amplifier and to convert the amplified signal and the conjugate image into a first output and a second output, wherein the first output comprises a first output signal quadrature and the second output comprises a second output signal quadrature.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

FIG. 1 depicts aspects of an embodiment of the present invention.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Optical parametric amplification and optical frequency conversion are generally separate processes that are orchestrated in separate devices. In an embodiment of the present invention, the two processes are advantageously combined. To this end, in an embodiment of the present invention, a method of cascading parametric amplification (PA) and frequency conversion (FC) in a single system and method is utilized to separate the real and imaginary quadratures of an arbitrary input signal. Unlike conventional complex signal detection and analysis, which requires coherent detection and downconversion to IF or baseband, the present invention is an ultra-wideband process (e.g., multi-terahertz) that leaves I/Q separated signals in the optical domain for further optical processing.

An advantage of the present invention is that certain embodiments of the present invention utilize phase-sensitive amplification and other noiseless parametric processes that enable ultra-low noise processing of THz signals. Although certain examples in this disclosure focus on signals within the THz range of the electromagnetic spectrum, embodiments of the present invention can be used similarly to process signals in different parts of the electromagnetic spectrum. Thus, the example of this terahertz signal conversion is given as an illustrative example and because ultra-low noise processing of THz signals has presented a particular challenge, as known to those of skill in the art.

Although phase-sensitive amplification has been previously considered for telecommunication applications, its application in THz signal processing is a unique aspect of the present technique. As will be discussed in greater detail, embodiments of the present invention may include amplifier that may be either phase insensitive or phase sensitive when performing parametric amplification. In an embodiment of the present invention, when input into an amplifier is a signal only, the parametric amplification is phase insensitive and the amplifier amplifies the signal in a phase-insensitive manner and generates an idler. However, in certain embodiments of the present invention, when the input signal comprises a THz signal (and/or a signal in another frequency band of the electromagnetic spectrum) that has been upconverted to an optical signal and an optical idler, the parametric amplification may be phase-sensitive; it is the presence of the idler (i.e. both inputs) that enables phase sensitive amplification.

An embodiment of the present invention utilizes subsequent frequency conversion (mixing) to achieve quadrature separation. The present technique provides an advantage by enabling further phase-sensitive processing of each quadrature of an arbitrary complex signal. As understood by one of skill in the art, the input signal is complex, but the separated idlers are real.

An embodiment of the present invention enables ultra-wideband separation of signal quadratures for I/Q processing, which can be a critical function for communications, sensing, and imaging applications. For example, outputs from embodiments of the present invention can be utilized thereafter in communications and imaging systems.

An embodiment of the present invention enables high-speed, multi-signal detection, including but not limited to multi-THz detection, with PSA-enhanced sensitivity and instantaneous I/Q separation in an optically-integrated platform.

An embodiment of the present invention separates quadratures, which are represented by real and imaginary parts of an input field. The present invention separates the quadratures optically to enable subsequent phase-sensitive processing in the optical domain. An embodiment of the present invention includes a novel combination of parametric amplification (PA) and frequency conversion (FC) into a single system and method to separate the aforementioned quadratures. PA and FC can be individual four-wave mixing (FWM) processes. (FC is nondegenerate and PA can be degenerate or nondegenerate.) As aforementioned, when the methods of the present invention are not utilized, these processes are separate and are accomplished in separate devices. PA amplifies an input signal and generates an idler (which is a conjugated copy of the signal) and FC, in contrast to PA, transfers power from a signal to an idler. The unique combination of these processes presents many advantages, which were described earlier, and enables both processes to be accomplished in sequence, within a single system.

FIG. 1 is a functional block diagram 100 of an embodiment of the present invention. The present technique includes obtaining a complex signal with arbitrary real and imaginary parts and splits the input into two output modes, a first output mode which includes a real part, and a second output mode which includes an imaginary part. By separating the signals into these two different output modes, the real and imaginary parts of the initial complex signal can be processed separately.

As seen in FIG. 1, an embodiment of the present invention cascades a parametric amplifier 110 with a frequency converter 130 to create separate outputs and enable separation of the quadratures of the input-complex signal. As such, an embodiment of the present invention is an optical parametric quadrature mixer for I/Q separation with optimal alignment for phase sensitive amplification (PSA) and processing of complex signals. As seen in FIG. 1, both a parametric amplifier 110 and a frequency converter 130 include optical pumps, with these stages separated by a pump filter 120.

As seen in FIG. 1, an embodiment of the present invention, a parametric amplifier 110 obtains a complex input signal. The input signal may include, but is not limited to, a wideband THz signal that has been upconverted to optical frequencies.

After obtaining the complex input signal, an embodiment of the present invention, the parametric amplifier 110 amplifies the signal and copies the wideband input signal onto another wavelength. In FIG. 1, the parametric amplifier 110 that amplifies the input is a chi(3)-based phase-insensitive amplifier (PIA). The parametric amplifier 110 both amplifies the input signal and generates an idler that is a conjugate image of the signal.

As aforementioned, PA can be degenerate or nondegenerate. As seen in FIG. 1, PA is degenerate when it is 1-pump 115, and it is nondegenerate when it is 2-pump 117.

FIG. 1 also includes a pump filter 120 which obtains the amplified signal and idler from the parametric amplifier 110, filters out the pump and supplies the amplified signal and idler to a frequency converter 130. The amplified signal and the idler obtained from the parametric amplifier 110 are obtained from the pump filter 120 by a frequency converter 130. In the non-limiting embodiment of FIG. 1, the frequency converter 130 is a chi(3) frequency convertor (mixer), operating with a conversion efficiency of 50%. As seen in FIG. 1, the amplified signal has both real and imaginary parts when input into the frequency converter 130, a chi(3) frequency converter (mixer), operating at a fixed conversion efficiency (e.g., 50%).

In an embodiment of the present invention, the frequency converter 130 mixes the signal and its conjugate (the idler) to separate the quadratures of the input complex signal. Thus, the frequency converter outputs the signal as a first signal quadrature, specifically, a first output frequency, a real part, and a second other signal quadrature, an imaginary part, a second output frequency. In an embodiment of the present invention, both the parametric amplifier 110 and the frequency converter 130 utilize optical pumps. In an embodiment of the present invention, in the PA, the sum of the pump phases equals the sum of the signal and idler phases, whereas in the FC, the difference between the pump phases equals the difference between the signal and idler phases.

In an embodiment of the present invention, the output signal from the frequency converter 130 carries the real quadrature of the input signal (at the same frequency), whereas the output idler carries the imaginary quadrature (at a different frequency).

Upon separation into distinct outputs and output by the frequency converter 130, the separated quadratures can be processed or detected separately. For example, large quadrature fluctuations can be reduced by subsequent gain-saturated amplification. In an embodiment of the present invention, at output, the separated quadratures are stronger than the original (e.g., THz) signal quadratures of the input.

A further embodiment of the present invention does not include a parametric amplifier 110 and an upconverted signal is obtained directly by the frequency converter 130. In this embodiment, upconversion produces an intermediate signal and idler of equal (comparable) strengths.

Although some of the examples given as related to various embodiments of the present invention utilize an upcoverted THz signal as an example of an input, one of skill in the art will recognize that various embodiments of the present invention can accommodate a large variety of input signals and separate the quadratures of these signals. The input signal can be any arbitrary signal and does not require any specific characteristics. The processes that comprise the system and method of FIG. 1 are further explained by the equations below, which illustrate the cascading use of PA and FC in the technique of the present invention to separate an input signal into I/Q quadratures at output.

As understood by one of skill in the art, a complex wave amplitude, a, includes real and imaginary parts, as represented in Equation 1 below. By inverting this relation, as seen in Equation 2 and Equation 3, individual values may be obtained for each quadrature, real and imaginary, and Equation 4 and Equation 5 further define the relationship of the quadratures, real and imaginary, to the respective portions, real and imaginary, of the amplitude. As seen in Equations 4 and 5, apart from factors of $2^{1/2}$, the quadratures are the real and imaginary parts of the amplitude.

$$a_r + i a_i \quad \text{(Equation 1)}$$

$$a_r = (a^* + a))/2 \quad \text{(Equation 2)}$$

$$a_i = i(a^* - a)/2 \quad \text{(Equation 3)}$$

$$q_r = 2^{1/2} a_r = (a^* + a)/2^{1/2} \quad \text{(Equation 4)}$$

$$q_i 2^{1/2} a_i = i(a^* - a)/2^{1/2} \quad \text{(Equation 5)}$$

As aforementioned, FC is based on nondegenerate FWM, while PA can be based on degenerate (1-pump 115) or nondegenerate (2-pump 117) FWM. When the methods of the present invention are not utilized, these processes are separate and are accomplished in separate devices and are not combined, as in the present invention, to separate quadratures. Both PA and FC are discussed below and then the novel combination of these processes in the present invention is reviewed.

PA amplifies the input signal and generates an idler (which is a conjugated copy of the signal). To this end, in traditional PA, one strong pump (p) or two strong pump waves (p and q) drive weak signal (s) and idler (i) waves in a third-order nonlinear medium. As understood by one of skill in the art, in degenerate four-wave mixing (FWM) $\pi_p \to \pi_s + \pi_i$, where $\pi_j$ represents a photon with frequency, $\omega_j$, but in nondegenerate FWM $\pi_p + \pi_q \to \pi_s + \pi_i$. In both of these FWM processes, pump photons are destroyed and signal and idler photons are created because, as aforementioned, PA amplifies an input signal and generates an idler. Equation 6 and Equation 7 below are input-output equations that describe the effects of PA on a signal and idler. In Equation 6 and Equation 7, $a_j$ is an input amplitude (of a wave 1 or 2), $b_j$ is an output amplitude, and $\mu$ and $\nu$ are complex transfer coefficients that depend on the dispersion and nonlinearity coefficients of a medium, a medium length, and the pump power(s). As known to one of skill in the art, transfer coefficients satisfy the equation $|\mu|^2 - |\nu|^2 = 1$, (if $|\mu| \gg 1$, then $|\nu| \gg 1$), The variable "j" is used as a general value placeholder for specific values in the equations.

$$b_1 = \mu a_1 + \nu a^*_2 \quad \text{(Equation 6)}$$

$$b_2 = \mu a_2 = \nu a^*_1 \quad \text{(Equation 7)}$$

FC is a nondegenerate FWM process where $\pi_p + \pi_s \to \pi_q + \pi_i$. FC, in contrast to PA, transfers power from a signal to an idler. In FC, process pump p and signal photons are destroyed. The effects of FC on a signal and idler are described in Equation 8 and Equation 9 below, which are input-output equations. In Equation 8 and Equation 9, $b_j$ is an input amplitude and is an output amplitude, and $\tau$ and $\rho$ are complex transfer coefficients that also depend on the dispersion and nonlinearity coefficients of the medium, the medium length and the pump powers. As recognized by one of skill in the art, the transfer coefficients satisfy the auxiliary equation $|\tau|^2 + |\rho|^2 = 1$ (if $|\tau| = 2^{-1/2}$, then $|\rho| = 2^{-1/2}$).

$$c_1 \tau b_1 + \rho b_2 \quad \text{(Equation 8)}$$

$$c_1 = \rho^* b_1 + \tau^* b_2 \quad \text{(Equation 9)}$$

As illustrated by FIG. 1, in an embodiment of the present invention, a parametric amplifier, followed by a frequency converter (PA followed by FC) separates the real and imaginary quadratures of an arbitrary input signal. Equation 10 and Equation 11 illustrate the relationships that enable the present technique to separate the quadratures in the manner described. For the purpose of illustrating the technique more clearly, the transfer coefficients in the equations are all real. By combining Equation 10 and Equation 11, the composite input-output relations are obtained.

In Equation 10 and Equation 11, the input signal amplitude $a_1$ is an arbitrary complex number, whereas the input idler amplitude $a_2$ is zero. As discussed in reference to FIG. 1, the parametric amplifier 110 (PA) amplifies the signal, and generates an idler that is a conjugate image of the signal. Subsequently, as also illustrated by FIG. 1, the frequency converter 130 (FC) mixes the signal and its conjugate to separate the signal quadratures. Specifically, in the presence of high gain ($|\mu| \approx |\nu| \gg 1$) and balanced conversion ($|\tau| = |\rho| = 2^{-1/2}$), the output amplitudes are represented in Equation 12 and Equation 13. As illustrated by Equation 12 and Equation 13, the output signal carries the real quadrature of the input signal (at the same frequency), whereas the output idler carries the imaginary quadrature (at a different frequency).

$$c_1 = (\tau \mu) a_1 + (\rho \nu) a^*_1 + (\rho \mu) a_2 + (\tau \nu) a^*_2 \quad \text{(Equation 10)}$$

$$c_2 = -(\rho \mu) a_1 + (\tau \nu) a^*_1 + (\tau \nu) a_2 - (\rho \nu) a^*_2 \quad \text{(Equation 11)}$$

$$c_1 \propto a_1 + a^*_1 \propto q_{1r} \quad \text{(Equation 12)}$$

$$c_2 \propto -a_1 + a^*_1 \propto -q_{1i} \quad \text{(Equation 13)}$$

In an embodiment of the present invention where the transfer coefficients are complex, phase differences may occur in the signals that will complicate separating the quadratures at output. However, in this embodiment, phase shifters may be inserted between a parametric amplifier and a frequency converter to correct the phase differences. Once the phase differences are corrected, the embodiment will separate the real and imaginary quadratures. In an embodiment of the present invention, a single phase shifter may be employed either to the idler or to the signal.

Equation 14 and Equation 15 represent input-output relations relevant to the present invention when the transfer coefficients are complex where $e_1 = e^{i\Phi 1}$ and $e_1 = e^{i\Phi 2}$ ($\Phi_1$ and $\Phi_2$ are indicated in the superscript as rendered in these parenthesis) are phase factors, $\tau = |\tau| e^{i\Phi_\tau}$, $\rho = |\rho| e^{i\Phi_\rho}$, $\mu = |\mu| e^{i\Phi_\mu}$, and $\nu = |\nu| e^{i\Phi_\nu}$. The first two terms in Equation 14 are proportional to the real quadrature provided that $\Phi_2 - \Phi_1 = \Phi_\tau - \Phi_\rho + \Phi_\mu - \Phi_\nu$. This condition also ensures that the first two terms in Equation 15 are proportional to the imaginary quadrature. In an embodiment of the present invention, by applying phase shifts with the correct phase difference, the PA followed by FC separates the real and imaginary quadratures, as seen in FIG. 1. As discussed above, 1-2 phase shifters may be applied in an embodiment of the present invention, $\Phi_\tau-\Phi_\rho+\Phi_\mu-\Phi_\nu$ may be applied to the idler and/or $-\Phi_\tau+\Phi_\rho-\Phi_\mu+\Phi_\nu$ may be applied to the signal.

$$c_1=(\tau e_1\mu)a_1+(\rho e_2\nu)a^*_1+(\rho e_2\mu)a_2+(\tau e_1\nu)a^*_2 \quad \text{(Equation 14)}$$

$$c_2=-(\rho^* e_1\mu)a_1+(\tau^* e_2\nu)a^*_1+(\tau^* e_2\nu)a_2-(\rho^* e_1\nu)a^*_2 \quad \text{(Equation 15)}$$

As discussed earlier, an embodiment of the present invention may be applied to separate out different types of signals.

A combination of real and imaginary parts of a signal may be used for secure communications, including but not limited to, binary morse code. In order to increase the information-transmission rate, people may send signals with both real and imaginary parts and in general, to detect these signals, an individual must detect both parts of the signals, which can present a challenge. Aspects of the present invention simplify these communications by enabling the separation of a signal into quadratures. By using aspects of the present invention to separate the quadratures, an individual will be aware of the components of the signal (real and imaginary) and can measure how strong it is by just doing power detection. If the individual wants to further process the signal optically, for example, and remove some fluctuations, the individual may do that for both real and imaginary parts because the present technique has separated the quadratures and has not converted them to electrons.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A method for separating signal quadratures comprising:
    obtaining, by a parametric amplifier, an input signal;
    amplifying, by the parametric amplifier, the input signal to create an amplified signal, generating, by the parametric amplifier, an idler comprising a conjugate image of the input signal;
    obtaining, by a pump filter, from the parametric amplifier, the amplified signal and the conjugate image;
    filtering out, by the pump filter, an optical pump from the amplified signal and the conjugate image;
    supplying, by the pump filter, the amplified signal and the conjugate image to a frequency converter; and
    obtaining, by the frequency converter, the amplified signal and the conjugate image, and converting the amplified signal and the conjugate image into a first output and a second output, wherein the first output comprises a first output signal quadrature and the second output comprises a second output signal quadrature.

2. The method of claim 1, where the amplifying comprises copying the input signal onto another wavelength.

3. The method of claim 1, wherein the first output signal quadrature is a real part of the input signal and the second output signal quadrature is an imaginary part of the input signal.

4. The method of claim 1, wherein the parametric amplifier is a chi(3) phase-insensitive amplifier.

5. The method of claim 1, wherein the frequency converter is a chi(3) frequency convertor operating with a conversion efficiency of about 50%.

6. The method of claim 1, wherein the first output comprises an output signal carrying a real quadrature of the input signal, and wherein the second output comprises an output idler carrying an imaginary quadrature of the input signal.

7. The method of claim 1, the method further comprising:
    before the obtaining, upconverting a terahertz (THz) signal to an optical signal and an optical idler, wherein the optical signal and the optical idler comprise the input signal.

8. The method of claim 1, wherein the parametric amplifier comprises an optical pump and in the parametric amplifier, a sum of pump phases equals a signal phase and an idler phase.

9. The method of claim 1, wherein the frequency converter comprises an optical pump and a difference between pump phases equals a difference between a signal phase and an idler phase.

10. A system for separating signal quadratures comprising:
    a parametric amplifier to obtain an input signal and to amplify the input signal to generate an amplified signal and an idler comprising a conjugate image of the input signal;
    a frequency converter, coupled to the parametric amplifier, to obtain the amplified signal and the conjugate image from the parametric amplifier and to convert the amplified signal and the conjugate image into a first output and a second output, wherein the first output comprises a first signal quadrature and the second output comprises a second signal quadrature; and
    a pump filter, coupled to the parametric amplifier and the frequency converter, to obtain the amplified signal and the conjugate image from the parametric amplifier, to filter an optical pump from the amplifier signal and the conjugate image, and to supply the amplified signal and the conjugate image to the frequency converter.

11. The system of claim 10, wherein the parametric amplifier and the frequency converter comprise optical pumps.

12. The system of claim 10, wherein the parametric amplifier is a chi(3) phase-insensitive amplifier.

13. The system of claim 12, wherein the parametric amplifier and the frequency converter comprise optical pumps.

14. The system of claim 10, wherein the frequency converter is a chi(3) frequency convertor operating with a conversion efficiency of about 50%.

15. The system of claim 10, wherein the parametric amplifier is degenerate.

16. The system of claim 10, wherein the parametric amplifier is nondegenerate.

17. The system of claim 10, wherein the parametric amplifier comprises an optical pump and in the parametric amplifier, a sum of pump phases equals a signal phase and an idler phase.

18. The system of claim 10, wherein the frequency converter comprises an optical pump and a difference between pump phases equals a difference between a signal phase and an idler phase.

* * * * *